Oct. 11, 1949.      S. G. ESKIN      2,484,405
SAFETY CONTROL APPARATUS FOR FUEL BURNERS
Filed Oct. 26, 1946                      2 Sheets-Sheet 1

INVENTOR.
SAMUEL G. ESKIN.
BY Albert J. Henderson
his ATTORNEY.

Oct. 11, 1949.  S. G. ESKIN  2,484,405
SAFETY CONTROL APPARATUS FOR FUEL BURNERS
Filed Oct. 26, 1946  2 Sheets-Sheet 2
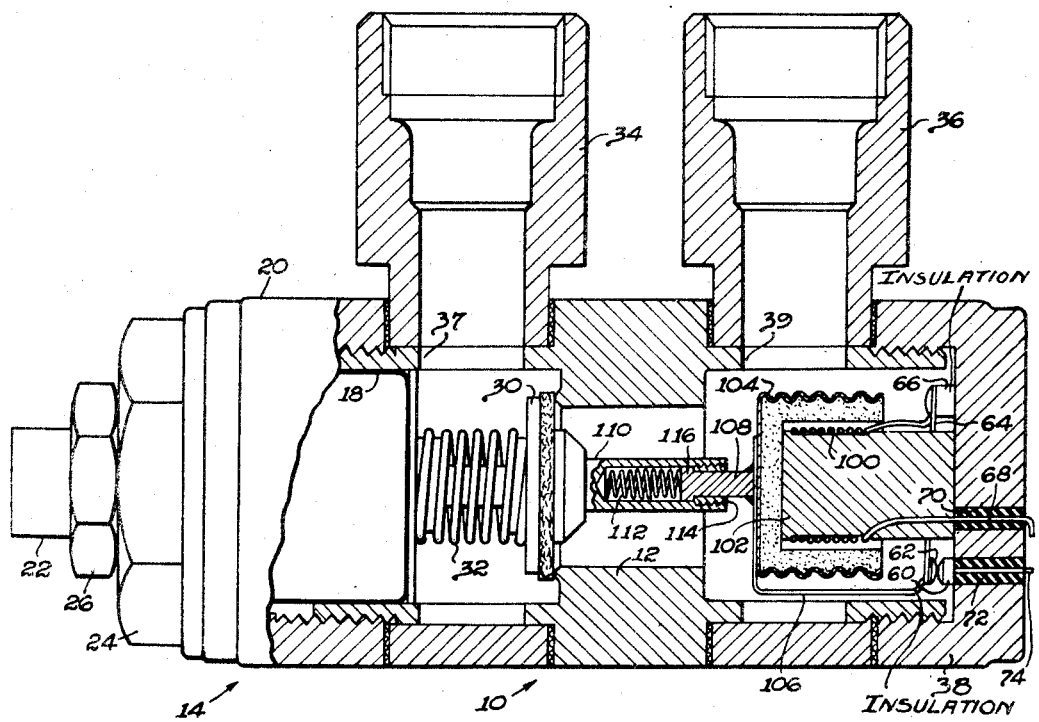
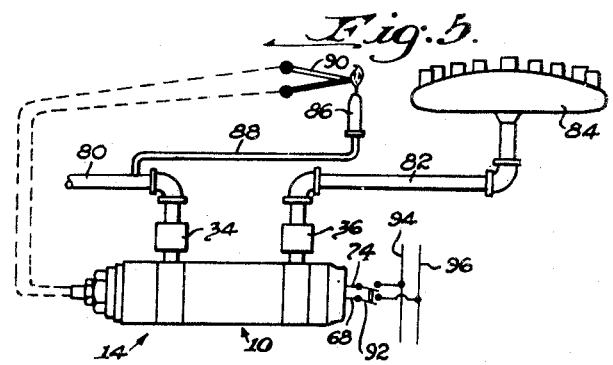
INVENTOR.
SAMUEL G. ESKIN.
BY
his ATTORNEY.

Patented Oct. 11, 1949

2,484,405

UNITED STATES PATENT OFFICE 2,484,405

SAFETY CONTROL APPARATUS FOR FUEL BURNERS

Samuel G. Eskin, Los Angeles, Calif., assignor to Robertshaw-Fulton Controls Company, a corporation of Delaware Application October 26, 1946, Serial No. 705,875

10 Claims. (Cl. 158—117.1)

This invention relates to electromagnetic control devices and, more particularly, to safety control devices for flow controlling apparatus.

Apparatus for controlling the flow of gaseous fuel to the burners of gas ranges, water heaters and other fuel burning appliances may incorporate safety devices of the electromagnetic type. The electromagnet may be energized by thermoelectric means responsive to the heat of a flame at a burner of the appliance and operative to cause closure of a control valve to prevent the flow of fuel when the flame is not burning. The energy generated by the thermoelectric means is usually sufficient only to hold the armature of the electromagnet in attracted position and the control valve open. Hence, means for moving the armature from released position and resetting it in attracted position must be employed to place the safety control in operation.

Electrically operated means for resetting the armature have been proposed in order to avoid the customary manual operation. A separate source of current supply must then be relied upon and this is usually the commercial A.-C. line. Electrically operated resetting devices involving solenoids are relatively expensive and produce considerable noise when operated from the A.-C. line. To eliminate the drawbacks of electrically operated resetting means, thermally responsive devices such as bimetallic flame operated elements have been employed. These elements are quiet in operation but difficult to install as resetting devices and are not reliable in operation after a period of exposure to the flame.

An object of this invention is to combine the reliability and ease of installation of electrically operated resetting devices with the desirable operating features of thermally responsive devices.

Another object of the invention is to discontinue the automatic reset operation as soon as the electromagnetic means is under thermoelectric control.

Another object of the invention is to terminate the consumption of commercial current as soon as the resetting operation is completed.

Another object of the invention is to permit considerable latitude in the type of thermally responsive device used in accomplishing the resetting operation.

Another object of the invention is to render the resetting device applicable to existing safety controls of many different designs without extensive modification thereof.

Another object of the invention is to obtain simplicity and economy in an automatic resetting device which will be durable and satisfactory in service.

Other objects and advantages will become apparent from the following description taken in connection with the accompanying drawings, wherein:

Fig. 5 is a longitudinal section similar to Fig. 1 but showing a further modified form of resetting device;

Fig. 6 is a schematic view of a fuel burner installation showing the improved control device applied thereto.

Figure 1:
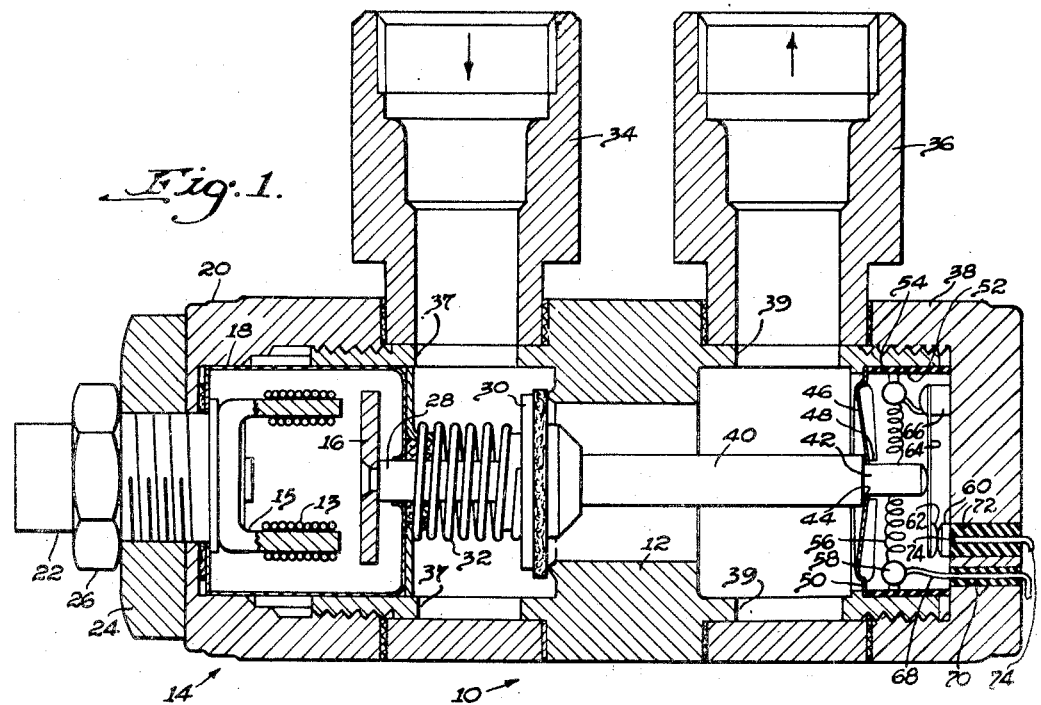
Fig. 1 is a longitudinal section through a thermomagnetic safety device embodying the invention.
Figure 2:
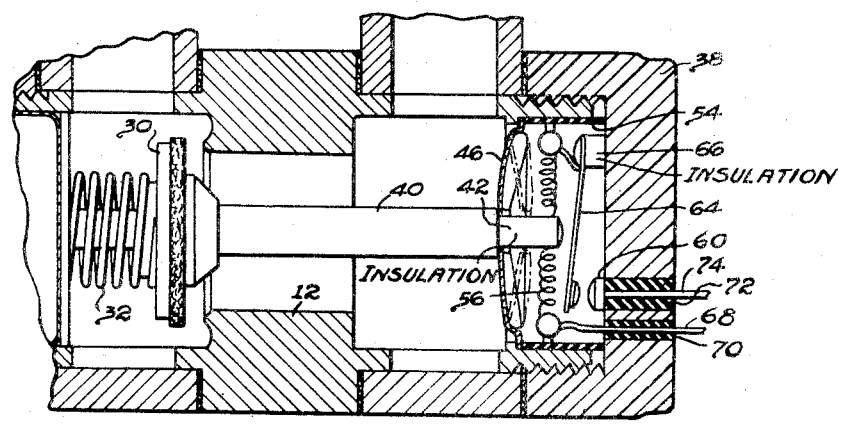
Fig. 2 is a partial longitudinal section similar to Fig. 1 but showing another position of the parts.

Referring more particularly to Figs. 1 and 2 of the drawings, the fluid flow control device to which the invention is applied is shown as comprising a thermomagnetic safety structure having a tubular body member 10 provided with an internal annular valve seat 12 interrupting the flow passage through the tubular body member 10 at a point substantially midway between the ends. One end of the tubular member 10 supports an electromagnetic device 14 embodying the usual winding 13 and horseshoe magnet 15 with the pole faces of which an armature member 16 is relatively movable between attracted and released positions. The magnet 15 and armature 16 are positioned within a magnet housing 18 which is supported in an end cap member 20 threadedly engaging the tubular body member 10. The magnet 15 is supported on a tubular terminal connector 22 which projects exteriorly of the end cap member 20 and is secured in position by means of the nuts 24, 26.

The armature member 16 is carried on a stem 28 which projects through the wall of the housing 18 opposite the terminal connector 22. The projecting end of the stem 28 carries a valve member 30 which is biased into engagement with the valve seat 12 by a coil spring 32 operative between the housing 18 and the valve member 30. The valve member 30 is adapted to control the flow of fluid such as gaseous fuel from an inlet 34 which is supported on the body member 10 between the valve seat 12 and the end cap member 20. An outlet 36 is provided for the fuel and is carried on the body member 10 between the opposite side of valve seat 12 and a second end cap member 38 which threadedly engages the opposite end of the body member 10.

The inlet 34 and outlet 36 are shown in registry with ports 37 and 39 respectively formed in the wall of the body 10. These ports 37, 39 are each formed as one of a plurality of such ports in the body 10. It will be observed that upon loosening of the end cap members 20 and 38, the position of the inlet 34 and outlet 36 can be adjusted relative to the tubular member 10 to facilitate the installation of the device in different locations. The disclosure of the control body and connections therefor is not part of my invention but is fully disclosed, shown and claimed in copending application of Eskin and Hayden, Serial No. 675,038, filed June 7, 1946.

Automatic means for resetting the armature 16 against the pole faces of the magnet 15 and moving the valve member 30 to open position relative to the valve seat 12 are provided in this embodiment. To this end, the valve member 30 is provided with a stem 40 projecting therefrom toward the end cap 38 and being provided with a reduced end portion 42 of insulating material, as noted in Fig. 2, located within the margin of end cap 38 but spaced from the bottom wall thereof. A shoulder 44, defined by the reduced portion 42 on the stem 40, engages the thermally responsive device of this invention which, in this embodiment, comprises a bimetallic disc 46.

When the disc 46 is in its normal position, as shown in Fig. 1, it is of concavo-convex form and the shoulder 44 of the stem 40 engages the face of the disc 46 adjacent a central aperture 48 therein and through which the reduced portion 42 projects. Moreover, the disc 46 may be provided with radial corrugations to impart additional flexibility thereto in order that it will readily change its contour when heated to the convexo-concave form shown in Fig. 2. An annular flange 50 projects from the periphery of the disc 46 and may be formed integral therewith or separately formed and secured thereto. The flange 50 serves as securing means for the disc 46 and is maintained within a recess 52 formed in the tubular body member 10 by means of an annular insulating member 54 which abuts the inner wall of the end-cap 38.

A heater coil 56 is supported within the insulating member 54 adjacent the disc 46 for heating the same. The opposite ends of the coil 56 are supported upon oppositely disposed supports 58 which project from the insulating member 54 and may be of ceramic material. Means responsive to the change in position of the disc 46 are provided for controlling the flow of electrical energy to the coil 56. In this embodiment, this means takes the form of switching means including a fixed contact 60 projecting from the inner wall of the end cap 38 and adapted to be engaged by a movable contact 62 when the disc 46 is unheated.

Such engagement of the contacts 60 and 62 is effected by the reduced portion 42 of the stem 40 which engages at its terminal end with a flexible switch arm 64 carrying the movable contact 62 at one end. The switch arm 64 has an inherent bias causing separation of the contacts 60 and 62 but this is overcome by operation of the reduced portion 42 as described. The opposite end of the switch arm 64 is secured to a terminal post 66 of insulating material, as noted in Fig. 2, projecting from the inner wall of the end cap 38 and spaced from the fixed contact 60. The terminal post 66 provides convenient means for connecting one end of the coil 56 to the switch arm 64 in good electrical contact therewith. The opposite end of the coil 56 is attached to a wire 68 extending through an insulating sleeve 70 in the end cap 38. The fixed contact 60 is connected to a wire 74 which extends through an insulating sleeve 72 also carried by the end-cap 38. As will hereinafter be described, the wires 68 and 74 may be connected to a source of electrical energy for energizing the coil 56 when the contacts 60 and 62 are in closed position.

Figure 3:
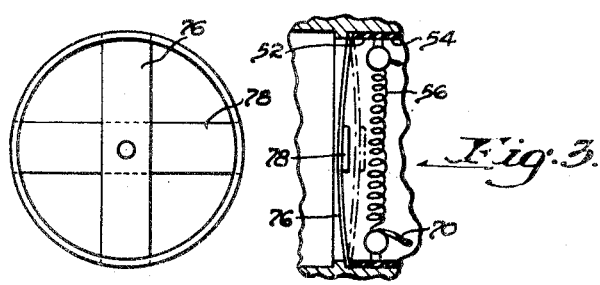
Fig. 3 is a partial longitudinal section of a modified form of resetting device.
Figure 4:
Fig. 4 is a front elevation of the modified device shown in Fig. 3.

In the embodiment shown in Figs. 3 and 4, the bimetallic disc 46 is replaced by a pair of bimetallic strips 76 and 78 arranged in cruciform fashion within the recess 52 where they are secured by the insulating member 54. As indicated in broken lines in Fig. 3, the bimetallic strips 76, 78 are normally curved toward the heater coil 56 but are adapted to reverse their position to the full line location shown when the coil 56 is heated.

Referring now more particularly to Fig. 6 of the drawings, the control body 10 containing the electromagnetic device 14 has the inlet 34 connected to a source of gaseous fuel supply through a pipe 80. The outlet 36 is connected by a pipe 82 to a main burner 84 of the appliance with which the control device is to be used. A pilot burner 86 is shown as adapted to receive fuel by a conduit 88 connected to the inlet pipe 80 and will serve to ignite fuel flowing from the main burner 84. The pilot burner 86 also serves to heat a thermocouple 90 having its leads connected to the winding 13 of the electromagnetic device 14. Thus, when the armature 16 is placed in attracted position relative to the pole faces of the magnet 15 then sufficient energy is generated by the heated thermocouple 90 to maintain the armature 16 in such position. The wires 68, 74 for the heater coil 56 are connected through a double-break main switch 92 to the line wires 94, 96 of a commercial current supply. It will be appreciated that the schematic view of Fig. 6 is merely exemplary of a typical installation and that other arrangements could be employed if desired.

In the operation of the device, reference may be had to Figs. 1, 2 and 6. Assuming that the pilot burner 86 is producing a flame and the thermocouple 90 is being heated thereby, then energy is supplied to the winding 13 of the magnet 15. Upon switch 92 being closed, a circuit is completed for the heater coil 56 from line wire 96, switch 92, wire 68, heater coil 56, terminal post 66, switch arm 64, contacts 62, 60 wire 74, switch 92 and line wire 94. The coil 56 being energized through the described circuit will become heated and after a predetermined period of time cause the bimetallic disc 46 to warp and move with a snap action from the position shown in Fig. 1 to that shown in Fig. 2. This action on the part of the disc 46 carries the stem 40 to the left as viewed in Fig. 1 due to the engagement of the shoulder 44 with the disc 46. The bias of the spring 32 is overcome and the valve member 30 becomes disengaged from the valve seat 12 substantially at the same time as the armature 16 is placed in attracted position against the pole faces of the magnet 15.

It will be noted, however, that when the snap-action of the bimetallic disc 46 occurs then the flexible switch arm 64 follows the movement of the reduced portion 42 of the stem 40 and causes the contacts 60 and 62 to be opened. The circuit for the heater coil 56 is thus discontinued and the source of heat of the bimetallic disc 46 is no longer present. Consequently, after a cooling period the bimetallic disc 46 snaps to the right from the position shown in Fig. 2 and resumes the position shown in Fig. 1. The stem 40, however, remains in the position shown in Fig. 2 due to the armature 16 being maintained in attracted position relative to the pole faces of the magnet 15 by the energy supplied from the thermocouple 90 to the winding 13.

It will be apparent, therefore, that even though the disc 46 has returned to its normal position shown in Fig. 1, the contacts 60 and 62 of the heater coil circuit remain open and no current flows to the heater coil 56. Thus, during the running operation of the main burner 84, which is ignited by the flame from the pilot burner 86 as soon as the valve member 12 is moved from its seat, there is no consumption of power from the outside source by the heater coil 56. Should the flame from the pilot burner 86 be extinguished causing cooling of the thermocouple 90, then the armature 16 will no longer be attracted and will be moved to its released position by operation of the coil spring 32. Such movement of the armature 16 to released position will also cause movement of the valve member 30 to closed position due to the connection between these members by the stem 28. The contacts 60 and 62 are again moved to closed position by the force exerted by the reduced portion 42 on the switch arm 64 so that the heater coil 56 again receives energy from the outside source such as the line wires 94, 96. The system is consequently recycling and will undergo such operation each time that the pilot burner flame is extinguished as long as the main switch 92 remains in closed position.

In the embodiment shown in Fig. 5 a different type of thermally responsive device is disclosed in place of the bimetallic disc 46 of the previous embodiment. As numerous parts of this embodiment in Fig. 5 correspond to those of the previous embodiment, similar reference characters have been used where applicable. The end cap 38 carries the terminal post 66 and the insulating sleeves 70 and 72. The terminal post 66 supports the flexible switch arm 64 to which the contact 62 is secured for operative engagement with the contact 60. In this embodiment, however, the terminal post 66 forms a connection between the switch arm 64 and one end of a heater coil 100 which is of helical form and has its opposite end secured to the wire 68 projecting through the insulating sleeve 70. The heater coil 100 is supported upon a projection 102 preferably of ceramic material from the inner wall of the end cap 38. The end face of the projection 102 engages the inner end wall of a bellows element 104 which is centrally depressed to accommodate the heater coil 100.

The bellows element 104 is charged with a liquid or a gas, depending upon the type of action desired, and will expand or contract longitudinally when heated and unheated, respectively, by the heater coil 100. Overlying the outer end wall of the bellows element 104 is an angular arm 106 which extends around the exterior of the bellows 104 toward the switch arm 64 on the opposite side to the contact 62 carried thereby. The terminal end of the arm 106 which engages the switch arm 64 is of insulating material. Thus, when the bellows 104 is in the contracted position shown in Fig. 5, the angular arm 106 will maintain the switch arm 64 in position to keep the contacts 60, 62 engaged.

The overlying portion of the angular arm 106 carries a connecting member in the form of a pin 108 secured thereto by welding, brazing or other suitable means. The pin 108 is slidable within a hollow stem 110 carried by the valve member 30. A coil spring 112 serves to bias the pin 108 outwardly of the stem 110 and such movement is limited by a threaded bushing 114 on the stem 110 which engages with an enlarged head portion 116 formed on the pin 108. Any tendency for overtravel during expansion of the bellows 104 will be absorbed by the spring 112 to prevent damage to the valve 30 or bellows 104.

The operation of the device disclosed in Fig. 5 is substantially the same as that of the embodiment previously described except that gradual, instead of snap, action is accomplished. Upon heating of the coil 100, the bellows 104 will expand and the bias of the spring 32 will be overcome to disengage the valve member 30 from its seat 12 and place the armature 16 against the pole faces of the magnet 15. It will be noted that in this embodiment the action is a gradual one due to the characteristics of the bellows 104.

During this resetting movement, the angular arm 106 is moved to the left, as viewed in Fig. 5, causing the flexible switch arm 64 to open the contacts 62 and 60 and discontinue the circuit for the heater coil 100. The bellows element 104 is thus caused to return to its contracted position while the valve member 30 remains in open position due to the armature 16 being held in attracted position by the energy supplied by the thermocouple 90 to the winding 13. Thus, an automatic resetting operation is also effected by the construction disclosed in this embodiment also. The stem 108 being attached to the angular arm 106 causes the contacts 60, 62 to remain open until the armature 16 is released and the bias of the flexible switch arm 64 is overcome. The system is thus recycling, as in the previous embodiment.

Many changes may be made in the details of construction and arrangement of parts within the scope of the appended claims and the invention is not limited to the precise embodiments shown and described herein.

I claim:

1. An electromagnetic control device comprising a coil and an armature relatively movable between attracted and released positions, means operative for energizing said coil sufficiently to hold said armature and coil in said attracted position but insufficiently to cause said movement from said released position, and resetting means operable for causing said movement mechanically to said attracted position and being thereafter rendered inoperable, said resetting means including a thermally responsive device operatively associated with said armature and coil and being adapted to change in position upon changes in the thermal condition thereof, an electric heater effective when energized for changing the thermal condition of said device, and means responsive to a change in position of said device for rendering said heater ineffective.

2. An electromagnetic control device comprising a coil and an armature relatively movable between attracted and released positions, means operative for energizing said coil sufficiently to hold said armature and coil in said attracted position but insufficiently to cause said movement from said released position, and resetting means operable for causing said movement mechanically to said attracted position and being thereafter rendered inoperable, said resetting means including a thermally responsive device operatively associated with said armature and coil and being adapted to change in position upon changes in the thermal condition thereof, an electric heater for said device effective when energized to cause said device to change in position, and switching means operable upon said change in position of said device for deenergizing said heater.

3. An electromagnetic control device comprising a coil member and an armature member, one of said members being movable relatively to the other between attracted and released positions, means operative for energizing said coil member sufficiently to hold said members in said attracted position but insufficiently to cause said movement from said released position, and resetting means operable for causing said movement mechanically to said attracted position and being thereafter rendered inoperable, said resetting means including a thermally responsive device adapted to change in position upon changes in the thermal condition thereof, a connection between said device and said one member for imparting movement thereto, an electric heater for said device effective when energized to cause said device to change in position, switching means controlling the energization of said heater, and operating means between said connection and said switching means for causing deenergization of said heater upon said change in position of said device.

4. An electromagnetic control device comprising a coil member and an armature member, one of said members being movable toward and away from the other to establish attracted and released positions respectively, means operative for energizing said coil member sufficiently to hold said members in said attracted position but insufficiently to cause said movement from said released position, and resetting means operable for causing said movement mechanically to said attracted position and being thereafter rendered inoperable, said resetting means including a device adapted for deflection toward said movable member when heated and causing movement thereof to said attracted position, an electric heater effective when energized for heating said device, and means responsive to said deflection of said device for rendering said heater ineffective.

5. An electromagnetic control device comprising a coil member and an armature member, one of said members being movable toward and away from the other to establish attracted and released positions respectively, means operative for energizing said coil member sufficiently to hold said members in said attracted position but insufficiently to cause said movement from said released position, and resetting means operable for causing said movement mechanically to said attracted position and being thereafter rendered inoperable, said resetting means including a device adapted for deflection toward said movable member when heated, a connection between said device and said movable member for moving the latter to said attracted position upon said deflection, an electric heater for said device effective when energized to cause said deflection thereof, switching means controlling the energization of said heater, and operating means between said connection and said switching means for causing deenergization of said heater upon movement of said movable member to said attracted position, said operating means being effective for causing reenergization of said heater upon movement of said movable member to said released position.

6. A control device comprising electromagnetic means having a member operable between controlling positions, means for energizing said electromagnetic means but insufficiently to actuate said member from one position to another, a heat motor operatively associated with said electromagnetic means and movable when heated for actuating said member to said other position, means for applying heat to said motor, means effective for discontinuing operation of said heat applying means, and means for rendering said last means effective upon actuation of said member to said other position by said heat motor.

7. A control device comprising electromagnetic means having a member operable between controlling positions, thermocouple means for energizing said electromagnetic means but insufficiently to actuate said member from one position to another, a bimetallic device adapted to move from one position to another with snap-action when heated, connecting means for imparting movement of said device to said member to position the same, an electric heater for said device, switching means for controlling the energization of said heater, and operating means between said connecting means and said switching means for opening the latter to cause deenergization of said heater when said member is positioned, said device thereby becoming cooled and moving to said one position while said member remains in said other position.

8. In a safety control device for flow controlling apparatus having a source of electrical energy associated therewith, the combination with an electromagnetic device including an armature member and a coil member connected to the source for energization thereby sufficiently to hold said armature member in attracted position relative to said coil but insufficiently to cause movement of said armature member from a released position, a valve member biased to a closed position and connected to said armature member, of resetting means operable for overcoming said bias and moving said valve member to open position and said armature member to attracted position, said resetting means including a device adapted for deflection toward said valve member and armature member when heated, a connection between said device and said valve member for moving the latter to open position and said armature member to attracted position upon said deflection, an electric heater connected for energization from a source separate from said coil member, means for supporting said heater in heating relation to said device, switching means controlling energization of said heater from said separate source, and means extending from said connection into operative engagement with said switching means for operating the same to cause deenergization of said heater upon movement of said valve member and said armature member upon said deflection of said device.

9. In a safety control device for fuel burning apparatus having thermoelectric means responsive to the flame of the burning fuel in said apparatus, the combination with an electromagnetic device having an armature member and a coil member connected to the thermoelectric means for energization thereby sufficiently to hold said armature member in attracted position relative to said coil member but insufficiently to cause movement of said armature member from a released position, a valve member for controlling flow of fuel to the apparatus, said valve member being biased to closed position and being connected to said armature member for movement therewith, of resetting means operable for overcoming said bias and moving said valve member to open position and said armature member to attracted position, said resetting means including a thermally responsive device operatively associated with said armature and valve members and being adapted to change in position upon changes in the thermal condition thereof, an electric heater for said device connected for energization from a source separate from the thermoelectric means, and means responsive to a change in position of said device for rendering said heater ineffective and maintaining said heater ineffective while said thermally responsive device returns to initial position and said valve member remains in open position due to said armature member being held in attracted position.

10. In a safety control device for fuel burning apparatus having thermoelectric means responsive to the flame of the burning fuel in said apparatus, the combination with a casing having inlet and outlet passageways for the fuel to be burned, an electromagnetic device in said casing having an armature member and a coil member connected to the thermoelectric means for energization thereby sufficiently to hold said armature member in attracted position relative to said coil member but insufficiently to cause movement of said armature member from a released position, a valve member reciprocable between open and closed positions in said casing for controlling flow of fuel in said passageways, means for biasing said valve member to closed position and said armature member to released position, of resetting means operable for overcoming said biasing means and moving said valve member to open position and said armature member to attracted position, said resetting means including a reciprocable heat motor positioned in said casing beyond said valve member and adapted for movement in a direction toward said valve member when heated, a connection between said device and valve member for moving the latter to open position and said armature member to attracted position upon said motor movement in said direction, an electric heater connected for energization from a source separate from said thermoelectric means and adapted for heating said heater, and means operable by said connection for causing deenergization of said heater upon said motor movement in said direction to reverse said motor movement to the opposite direction while said valve member remains open and said armature member is held in attracted position if said coil is sufficiently energized by the thermoelectric means.

SAMUEL G. ESKIN.

REFERENCES CITED

The following references are of record in the file of this patent:

UNITED STATES PATENTS

| Number | Name | Date |
|---|---|---|
| 1,883,251 | Spencer et al. | Oct. 18, 1932 |
| 2,290,048 | Hildebrecht | July 14, 1942 |
| 2,391,753 | Strobel | Dec. 25, 1945 |